United States Patent

[11] 3,580,272

| [72] | Inventors | Russell G. Sherman<br>la Verne;<br>Robert P. Koenig, Torrance, Calif. |
|---|---|---|
| [21] | Appl. No. | 849,966 |
| [22] | Filed | Aug. 14, 1969 |
| [45] | Patented | May 25, 1971 |
| [73] | Assignee | Powers Regulator Company<br>Skokie, Ill. |

[54] AUTOMATIC AIR FLOW REGULATOR
3 Claims, 4 Drawing Figs.

[52] U.S. Cl. ................................................ 137/486
[51] Int. Cl. ................................................. G05d 7/03
[50] Field of Search ........................................ 137/486,
501, 489, 500, 489.5

[56] References Cited
UNITED STATES PATENTS

| 750,752 | 1/1904 | Cole | 137/486 |
| 1,685,205 | 9/1928 | Stein | 137/486 |
| 1,725,374 | 8/1929 | Rush | 137/486 |
| 2,098,574 | 11/1937 | Doyle | 137/501X |
| 3,002,521 | 10/1961 | Greenlees et al. | 137/486X |

*Primary Examiner*—Henry T. Klinksiek
*Assistant Examiner*—R. B. Rothman
*Attorney*—Hume, Clement, Hume & Lee ABSTRACT: An automatic air flow regulator for use in the airline of a pneumatic tube system for automatically maintaining a preset velocity of air flow within the airline regardless of the load contained throughout the pneumatic tube system comprising a sensing means adapted to sense the pressure velocity of the air in the airline and a control means connected to the sensing means for regulating the velocity of the air flowing through the airline in response to the sensing means.

Patented May 25, 1971
3,580,272
2 Sheets-Sheet 1
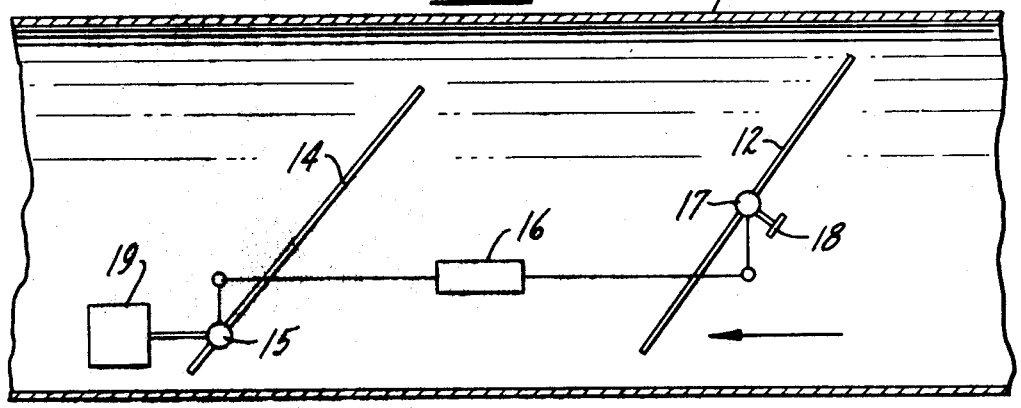
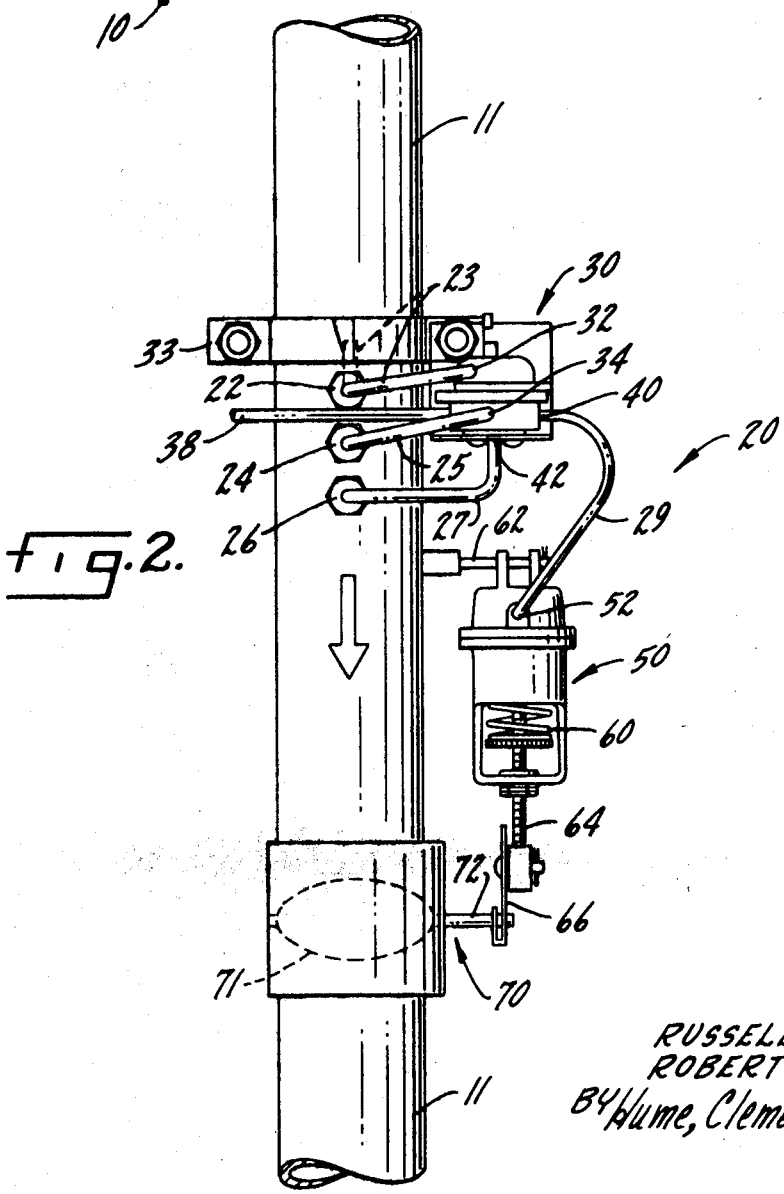
INVENTORS.
RUSSELL G. SHERMAN
ROBERT P. KOENIG
BY Hume, Clement, Hume & Lee
Attorneys.

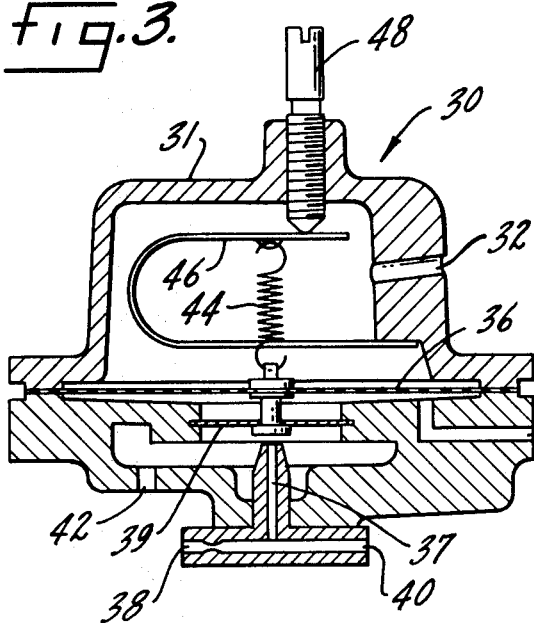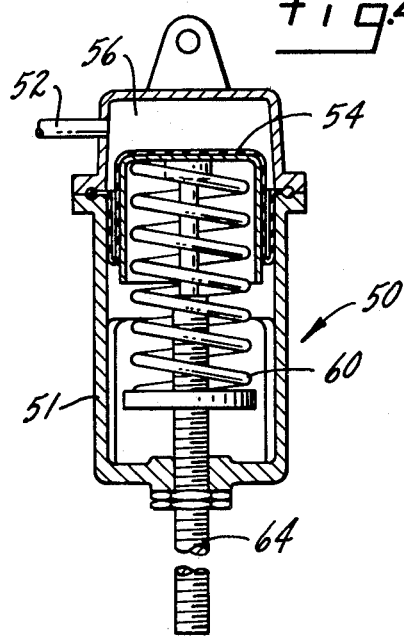

AUTOMATIC AIR FLOW REGULATOR

BACKGROUND OF THE INVENTION

The present invention relates to automatic airflow regulators and more particularly to automatic airflow regulators for utilization in the airline of a pneumatic tube system.

Those concerned with the development of pneumatic tube systems have long recognized the need for developing an automatic means for regulating the airflow throughout the tube system. The present invention fulfills this need. Presently, there are no methods known for automatically regulating the airflow through a pneumatic tube system.

Designers, in attempting to regulate the airflow, have resorted to many methods which have not served the purpose. There are four commonly used methods for adjusting the airflow in a pneumatic tube system. One such method has been to adjust the blast gate on any given compressor unit to full load amperage. In a second method, compressor units have been sized to meet the ultimate requirements of the system and then all lines which are not in use are capped. A third method has been to adjust the airlines through feeling the intake on any given line and then trying to balance all the lines so that they feel the same and seem to produce enough cubic feet per minute to put the carrier in motion. In a fourth method, a fixed restricting windgate has been used for all lines serviced by one compressor unit.

The first method of adjusting the blast gate on any given unit to full load amperage has not proved entirely satisfactory since this would cause the machine to be set for the full volume it can produce which, in the majority of cases, is more than is required on the system.

Sizing of the compressor unit for the ultimate system in capping off lines not in use creates a larger differential between the operating cubic feet per minute and the designed cubic feet per minute of the power unit and it is evident, that this excessive restriction will affect the efficiency of the machine and will also cause pulsating turbulence within the unit.

The third practice of adjusting the volume consumed in each line by trial and error is obviously inadequate. With this method there is considerable time wasted in going to each intake being serviced by the unit, adjusting it by what you feel, and then going back and readjusting it. This, of course, can go on and on, and when a near balancing has been accomplished, it probably would be left in this manner even though it would result in some cases in a poorly operating system.

Lastly, using a fixed restricting windgate for all airlines serviced by one compressor is unsatisfactory since on large automatic systems where many air circuits are terminating at a single manifold there is a condition where a carrier inserted into any given line will affect the efficiency of the remaining lines on the manifold. Since large automatic systems frequently have excessive traffic, periods will be encountered where the overloading to one line will simulate an overload effect on all additional lines.

The utilization of automatic airflow regulation will overcome these deficiencies.

SUMMARY OF THE INVENTION

The automatic airflow regulator of the instant invention will provide a means for regulating the pressure velocity in the airline of a pneumatic tube system. This is desired since when no carriers are in the tube system you have a higher volume of air than when carriers are present in the tube system. To accomplish this, a pressure velocity sensing means will be placed in the airline of the tube system. This sensing means will be connected to a means for regulating the velocity of the air flowing in the airline so as to automatically maintain a preset velocity of airflow within the airline regardless of the load contained throughout the pneumatic tube system.

Therefore, an object of the present invention is to eliminate the detrimental air shift that is presently experienced by all pneumatic tube installations.

Another object is to provide a better control over carrier velocity and static vacuum which is necessary on all large automatic tube systems.

A further object is the provision of an airflow regulator which allows for the reduction of air volume required per air circuit.

Still another object is to provide an accurate automatic means for adjusting the airflow throughout a pneumatic tube system regardless of the load contained in said system.

Still another object is to provide an automatic airflow regulator which may be adapted to existing pneumatic tube systems already in service.

Other objects and many of the attendant advantages of this invention will be readily appreciated as the same becomes better understood by reference to the following detailed description when considered in connection with the accompanying drawings:

BRIEF DESCRIPTION OF THE DRAWINGS

FIG. 1 is a schematic view of an automatic airflow regulator.

FIG. 2 is a schematic view of another embodiment of an automatic air flow regulator.

FIG. 3 is an enlarged view of the pressure velocity sensor utilized in the automatic airflow regulator of FIG. 2.

FIG. 4 is an enlarged view of the air motor utilized in the automatic airflow regulator of FIG. 2.

DESCRIPTION OF THE PREFERRED EMBODIMENT

Referring now to the drawings wherein like reference characters designate like or corresponding parts throughout the several views, there is shown in FIG. 1 an automatic airflow regulator 10 located in the airline 11 of a pneumatic tube system.

Automatic airflow regulator 10 comprises an airflow windgate 12, which acts as a restrictor to control the pressure velocity of the air in airline 11, and a regulator windgate 14 which acts as a sensor to sense the pressure velocity of air in airline 11. Airflow windgate 12 is mechanically connected to regulator windgate 14 by a linear adjuster 16.

The principle of operation for the automatic airflow regulator 10 is the utilization of the impact pressure, derived from the air velocity in airline 11 of a pneumatic tube system, against the regulator windgate 14 whose pivot shaft 15 has been set off center to cause a leverage effect. Regulator windgate 14 which is mechanically connected through linear adjuster 16 to the airflow windgate 12, senses the air velocity in airline 11 and then regulates the position of airflow windgate 12 to control the amount of the air velocity which is passing through airline 11.

Airflow windgate 12 receives the same airflow pressure that regulator windgate 14 receives; however, since the airflow windgate 12 pivots about a point 17 which is centered so that the forces are equal, the airflow windgate 12 will retain its set position. Regulator windgate 14 when receiving an abnormal pressure due to an increased velocity of airflow will automatically adjust the airflow windgate 12 to decrease this velocity, thereby maintaining a constant velocity through the regulator windgate 14.

In pneumatic tube systems where there are series of dispatchers on a given air circuit, these dispatchers are at various points along the air circuit and thereby cause a constant fluctuation of circuit lengths when on vacuum or pressure. Normally, when the circuit is shortened there is a lesser friction loss. This is automatically compensated by a greater volume in velocity of air to maintain the predetermined friction loss. By utilizing an automatic airflow regulator, the greater volume and velocity is eliminated by automatically adjusting the predetermined friction loss and airflow windgate.

To install an automatic airflow regulator in an existing pneumatic tube system which already contains an airflow windgate 12, a regulator windgate 14 is installed. The regulator windgate 14 when first installed is not connected to the airflow windgate but is allowed to flow free. The airflow windgate 12 is then adjusted for proper air restriction so as to maintain the desired cubic feet per minute at the designed velocity. The shaft of airflow windgate 12 is then locked into position by a setscrew 18. An adjustable counterweight 19 is provided on regulator windgate 14. Counterweight 19 is then adjusted so as to bring the regulator windgate 14 near the optimum efficiency, so as to be immediately affected by any change in velocity. Airflow windgate 12 is then readjusted for the proper cubic feet per minute and velocity. The linear adjuster 16 is then attached to the shaft of regulator windgate 14 without changing the pitch of the regulator windgate 14. The setscrew on the airflow windgate is then removed and the automatic airflow regulator is ready for operation. This initial adjustment of the pitch of both regulator windgate 14 and airflow windgate 12 determines the set point or preset velocity of airflow which is to be maintained regardless of the load throughout the pneumatic tube system.

As the velocity of air flowing through airline 11 is increased or decreased, regulator windgate 14 whose pivot shaft 15 is off center, will fluctuate in response to the changing velocity. Airflow windgate 12 whose pivot point 17 is on center will receive equal pressure both above and below the center point and will, therefore, remain stationary. As regulator windgate 14 changes pitch, linear adjuster 16 will cause the airflow windgate 12 to rotate around its pivot point 17 thereby changing the pitch of the airflow windgate 12 and necessarily this change in the pitch will change the amount of air flowing past airflow windgate 12.

Referring now to FIG. 2, there is shown an alternative version of an airflow regulator 20 which represents the preferred embodiment. As in FIG. 1, the airflow regulator 20 is connected to the airline 11 of a pneumatic tube system. Airflow regulator 20 broadly comprises a sensing means 30, which in the preferred embodiment is a constant air volume regulator and a control means 70, which in the preferred embodiment is a butterfly valve. The control means 70 and the sensing means 30 are connected by an air motor 50. Air motor 50 controls the pitch of control means 70 in response to the pressure differential sensed by the sensing means 30.

It will be recognized by one skilled in the art that sensing means 30 of FIG. 2 corresponds to regulator windgate 14 of FIG. 1 while control means 70 corresponds to airflow windgate 12. Motor 50 in FIG. 2 performs the equivalent function to linear adjuster 16 in FIG. 1.

In the preferred embodiment, sensing means 30 comprises a constant air volume regulator. It will be recognized by one skilled in the art that any type of constant air volume regulator may be utilized in automatic airflow regulator 20. One such constant air volume regulator is manufactured by the Powers Regulator Company and is fully described in Powers Technical Instruction PR-269-1. The air motor 50 used in automatic airflow regulator 20 may be any conventional air- driven motor. One such motor is manufactured by the Powers Regulator Company and is described in Powers Technical Instruction PM-331- Control means 70 may be any conventional restrictor means or butterfly valve. In the preferred embodiment control means 70 is a free flow butterfly valve which rotates on bearings. One such butterfly valve is manufactured by the Grover Company, a subsidiary of the Powers Regulator Company, and is described in Powers-Grover Technical Instruction P/G 8–4.1. It will be recognized by one skilled in the art that these components are only exemplary and that any suitable sensing means, control means and linkage means may be utilized.

FIG. 3 illustrates the sensing means 30 in greater detail while FIG. 4 illustrates the air motor 50 in greater detail. Sensing means 30 comprises a constant airflow regulator having a housing 31, a high-pressure regulator port 32, a low-pressure regulator port 34, an air supply port 38, an output pressure port 40, and a regulator exhaust port 42 contained therein. A diaphragm 36 is provided within the housing 31. The diaphragm 36 is connected between a seat 39 and a tension spring 44. The tension in spring 44 may be adjusted by utilizing an adjustment screw 48 and an adjustment spring 46. The constant airflow regulator 30 is a constant waste instrument having a constant output bleed through output pressure port 40. When controlling at its set point, determined by the tension in spring 44, the nozzle 37 leaks air through output pressure port 40 at a rate which maintains a predetermined pressure in the control line that is connected to output pressure port 40. Referring to FIG. 2, this would be control line 29.

A constant air supply is inserted into the constant air volume regulator 30 through air supply port 38. Air leakage from the nozzle is expelled from the constant air volume regulator 30 through regulator exhaust port 42. The airflow to be sensed is introduced into the constant airflow regulator 30 through high-pressure regulator port 32 and low-pressure regulator port 34. It can clearly be seen from FIG. 2 that the high-pressure regulator port 32 senses the total pressure head of the airflow through a small tube 23 pointed upstream in the airline 11 and the low pressure regulator port 34 senses the static pressure in the airline 11. When the force of the tension of the spring 44 and the static pressure sensed by the low-pressure regulator port 34 equals the total pressure sensed by the high-pressure regulator port 32, a predetermined pressure is maintained in the control line 29. When there is a change in the velocity pressure of the airflow in the airline 11, there will be a change in the differential between the total pressure and the static pressure, thus causing a mismatch in the initial balance between the pressure sensed by the high pressure regulator port 32 and the combined forces represented by the pressure sensed by the low pressure regulator port 34 and the tension force in the spring 44. Assuming that the dynamic pressure has increased, the sensing pressure sensed through high-pressure sensing port 32 increases above the set point, the diaphragm 36 moves the seat 39 closer to the nozzle 37 that is connected to output pressure port 40. This reduces the leakage and increases the control pressure in output pressure port 40. Assuming that the total pressure has decreased, the sensing pressure sensed through the high-pressure sensing port 32 decreases below the set point, seat 39 moves away from nozzle 37, increasing the leakage through output pressure port 40 and decreasing the control pressure. The adjustment screw 48 changes the force exerted on diaphragm 36 by tension spring 44. When turned counterclockwise, the force is increased. A greater sensing pressure is required to move diaphragm 36 and seat 39 toward nozzle 37 and the set point is therefore increased.

Referring now to FIG. 4, air motor 50 is shown in greater detail. Air motor 50 comprises a housing 51, an air pressure input port 52, a diaphragm 54, and an input chamber 56. Diaphragm 54 is an engagement with a spring 60 and a motor shaft 64. As air pressure is applied to the diaphragm through air pressure input port 52, the diaphragm presses against spring 60 thereby overcoming the tension of the spring and advances motor shaft 64. As pressure increases, the motor shaft advances and as pressure decreases, tension in the spring returns the motor shaft to its original position. Now, again referring to FIG. 2, taken in conjunction with FIGS. 3 and 4, the operation of automatic airflow regulator 20 will be explained. The automatic airflow regulator 20 is installed in the airline 11 of a transmission loop of a pneumatic tube system. The principle of operation is to utilize the velocity pressure of airflow to control the compensating moveable control means 70. This principle replaces the conventionally used fixed restrictor within the airline and allows a constant total level of restriction so as to maintain a preset volume of air in a given air circuit. This level is maintained even though a variety of loads or carriers or obstructions may be encountered.

To install automatic airflow regulator 30, apertures 22, 24 and 26 are installed into airline 11. Sensing means 30 is connected to airline 11 by bracket 33. Aperture 22 in the airline 11 is connected to high pressure regulator port 32 of the sensing means 30 by a small tube 23 pointed upstream in airline 11 while aperture 24 is connected to low-pressure regulator port 34 by a tube 25. REgulator exhaust port 42 is connected to aperture 26 by a tube 27. In operation, as air flows through airline 11 in the direction of the arrow, sensing means 30 senses the pressure differential on either side of diaphragm 36 as explained above. A small amount of leakage from nozzle 37 is returned to the airline 11 through tube 27. A constant supply of air is injected into the air supply port 38 as air motor 50 is mounted to airline 11 by bracket 62. Control line 29 is connected between output pressure port 40 of the sensing means 30 and air pressure input port 52 of air motor 50. During the steady state condition the constant output bleed from sensing means 30 through regulator exhaust port 42 causes just enough pressure to be present in output pressure port 40 to overcome the spring tension in spring 60 of air motor 50; however, not enough pressure is exerted to displace motor shaft 64. As the pressure in airline 11 increases above the set point which has been adjusted by utilizing the constant air volume regulator 30, as explained above in conjunction with FIG. 3, the diaphragm 36 moves seat 39 closer to nozzle 37 thereby reducing the leakage through regulator exhaust port 42 and thereby increasing the control pressure in the output pressure port 40. This increased pressure is transmitted through control line 29 to air pressure input port 52 of motor 50. This increased pressure causes diaphragm 54 to overcome this spring tension in spring 60 thereby displacing shaft 64 of the motor. Motor shaft 64 is connected by a mechanical linkage 66 to control means 70. This movement of shaft 64 and linkage 66 changes the positioning of control means 70 thereby compensating for the increased pressure in the airline. Control means 70 will be moved so as to decrease the pressure in the airline to conform with the original set velocity thereby maintaining a preset velocity of airflow within the airline 11 regardless of the load contained throughout the pneumatic tube system. When the pressure through the airline 11 decreases below the set point as sensed by the sensing means 30, seat 39 moves away from the nozzle 37, thereby increasing the leakage and decreasing the control pressure through output pressure port 40. This decreased pressure is then transmitted through control line 29 to motor 50 and shaft 64 is then withdrawn, thereby again changing the position of control means 70. Thus, regardless of whether the load in the pneumatic tube system causes an increase or decrease of pressure in the airline 11, the automatic airflow regulator 20 will return the amount of flow throughout the airline 11 to a constant preset velocity.

In the preferred embodiment, control means 70 comprises a butterfly valve 71 which is approximately the same size as airline 11. The butterfly valve freely rotates on a shaft 72 through the use of bearings, not shown. However, it will be recognized by one skilled in the art that any conventional free-flowing air restrictor may be utilized.

The sensing means 30 is preferably the air volume regulator manufactured by the Powers Regulator Company and described above. However, it will be recognized by one skilled in the art that any constant air volume regulator or similar sensing means may be used.

In summation, as the pressure velocity of the air flowing through airline 11 varies due to the load throughout the pneumatic tube system, the automatic airflow regulators 10 and 20 described above will regulate the amount and velocity of air throughout this system to maintain a constant velocity, regardless of load. It should be understood, of course, that the foregoing disclosure relates only to a preferred embodiment of the invention and that numerous modifications or alterations may be made therein without departing from the spirit and the scope of the invention.

What we claim is:

1. An automatic airflow regulator for use in an airline of a pneumatic tube system comprising:

a proportional acting regulator means having a high-pressure chamber, a low-pressure chamber, a pressure-responsive diaphragm separating said high-pressure chamber and said low-pressure chamber, adjustable spring means opposing the force exerted by fluid pressure in said high-pressure chamber on said diaphragm, an exhaust chamber, a bleed nozzle communicating with said exhaust chamber, a supply pressure inlet for said bleed nozzle, a flow restriction interposed between said supply pressure inlet and said bleed nozzle, and a control pressure outlet communicating with said bleed nozzle, and a bleed-modifying member for said bleed nozzle connected with said diaphragm for modifying the bleed from said bleed nozzle in proportion to the extent of departure of the difference between fluid pressure in said high-pressure chamber and fluid pressure in said low-pressure chamber from a predetermined set point determined by the setting of said adjustable spring means to increase the pressure level at said control pressure outlet in proportion to extent of departure of said difference in excess of said set point and to decrease the pressure level at said control pressure outlet in proportion to the extent of departure of said difference below said set point;

means connecting said high-pressure chamber to said airline for providing a variable pressure in said high-pressure chamber indicative of total pressure in said airline;

means connecting said low-pressure chamber to said airline for providing a variable pressure in said low-pressure chamber indicative of static pressure in said airline;

means connecting said exhaust chamber to said airline for providing a variable pressure in said exhaust chamber indicative of static pressure in said airline to modify the pressure level at said control pressure outlet as a function of static pressure in said airline;

a variable flow restrictor disposed in said airline; and an air motor solely responsive to said pressure level at said control pressure outlet for positioning said variable flow restrictor to restrict the flow rate in said airline in proportion to said control pressure outlet.

2. The apparatus of claim 1 wherein said variable flow restrictor comprises a butterfly valve and wherein said butterfly valve is adapted to pivot on an axis which coincides with the axis of said airline.

3. The apparatus of claim 2 wherein said butterfly valve is free flowing.

PO-1050
(5/69)

UNITED STATES PATENT OFFICE
CERTIFICATE OF CORRECTION

Patent No. 3,580,272        Dated May 25, 1971

Inventor(s) RUSSELL G. SHERMAN and ROBERT P. KOENIG

It is certified that error appears in the above-identified patent and that said Letters Patent are hereby corrected as shown below:

Column 3, line 57, after "PM-331-" insert --1.--.

Column 4, line 32, "dynamic" should read --total--.

Column 5, line 2, "REgulator" should read --Regulator--.

Signed and sealed this 2nd day of November 1971.

(SEAL)
Attest:

EDWARD M. FLETCHER, JR.      ROBERT GOTTSCHALK
Attesting Officer             Acting Commissioner of Patents

UNITED STATES PATENT OFFICE
CERTIFICATE OF CORRECTION

Patent No. 3,580,272          Dated    May 25, 1971

Inventor(s) RUSSELL G. SHERMAN and ROBERT P. KOENIG

It is certified that error appears in the above-identified patent and that said Letters Patent are hereby corrected as shown below:

Column 4, line 4, delete "output" (first occurrence) and substitute --waste--.

Column 4, lines 4 and 5, delete "output pressure port 40" and substitute --exhaust port 42--.

Column 4, lines 6 and 7, delete "output pressure port 40" and substitute --exhaust port 42--.

Column 4, lines 42 and 43, delete "output pressure port 40" and substitute --exhaust port 42--.

Signed and sealed this 18th day of April 1972.

(SEAL)
Attest:

EDWARD M. FLETCHER, JR.
Attesting Officer

ROBERT GOTTSCHALK
Commissioner of Patents